(12) United States Patent
Cleveland

(10) Patent No.: US 7,788,849 B1
(45) Date of Patent: Sep. 7, 2010

(54) MULTI-USE PLANTING SYSTEM

(76) Inventor: Grant Cleveland, P.O. Box 808, Chagrin Falls, OH (US) 44022

( * ) Notice: Subject to any disclaimer, the term of this patent is extended or adjusted under 35 U.S.C. 154(b) by 85 days.

(21) Appl. No.: 12/283,047

(22) Filed: Sep. 9, 2008

Related U.S. Application Data

(62) Division of application No. 11/536,865, filed on Sep. 29, 2006.

(51) Int. Cl.
*A01G 9/16* (2006.01)
*B65D 21/02* (2006.01)

(52) U.S. Cl. ............... 47/66.7; 47/39; 47/69; 206/201; 220/4.27

(58) Field of Classification Search ........... 47/65.5, 47/66.1, 69, 39, 66.7; 206/501; 220/4.26, 220/4.27; 119/245–247; D11/143, 145
See application file for complete search history.

(56) References Cited

U.S. PATENT DOCUMENTS

| | | | | | |
|---|---|---|---|---|---|
| 1,270,554 | A | * | 6/1918 | Rubel | 206/423 |
| 3,314,194 | A | * | 4/1967 | Halleck | 47/69 |
| 3,704,545 | A | * | 12/1972 | Van Reisen | 47/69 |
| 4,236,353 | A | * | 12/1980 | Sorenson | 47/81 |
| 6,474,017 | B1 | * | 11/2002 | White | 47/41.01 |
| 6,581,330 | B1 | * | 6/2003 | Helsloot et al. | 47/84 |
| 7,380,662 | B2 | * | 6/2008 | Olsthoorn | 206/423 |
| 7,536,828 | B2 | * | 5/2009 | Slingerland et al. | 47/65 |

* cited by examiner

*Primary Examiner*—Rob Swiatek
*Assistant Examiner*—Kristen C Hayes
(74) *Attorney, Agent, or Firm*—Bryan Cave LLP

(57) ABSTRACT

A container includes a top having downwardly extending walls adapted to releasably attach to upwardly extending walls of a bottom of a planter, the top of the container further adapted to releasably attach to the bottom of the planter so that when the downwardly extending walls of the container are attached to the upwardly extending walls of the planter the container functions as a terrarium enclosure and when the top of the container is attached to the bottom of the planter the container functions as a pedestal to support the planter.

9 Claims, 7 Drawing Sheets

72

Instructions for Multi-Use Planting Kit

Your kit contains two containers and everything else
you need to start growing your plant The first container is used for placing soil, water, seeds, and/or plants.

The second container can be used in two ways:

1) When the second container snap fits atop of
the first container it acts as a terrarium enclosure 2) When the first container snap fits atop of
the second container it acts as a pedestal To get started growing your plant place into the first container
seeds, and/or plants in soil and water and then snap-fit
the second container atop the first container to form a terrarium When the plant has nearly outgrown the terrarium
remove the second container from the first container
and then snap-fit the first container atop the second container
to form a planter supported on a pedestal

Figure 7

MULTI-USE PLANTING SYSTEM

CROSS-REFERENCE TO RELATED APPLICATIONS

This application is a divisional of patent application Ser. No. 11/536,865, filed Sep. 29, 2006, which is incorporated herein by reference in its entirety.

FIELD OF THE INVENTION

The present invention relates generally to planting systems for the propagation of vegetation and, more particularly, to a planting system including a container having multiple uses for growing plants from seeds or seedlings by a variety of methods.

DESCRIPTION OF THE RELATED ART

A terrarium is a fully enclosed, small container, wholly or predominantly made of glass or other transparent material, the terrarium being adapted for the indoor cultivation of moisture-loving plants. The earliest form, known as a Wardian case, was invented by an English botanist in the 19th century, the case being constituted by a box-like glass dome fitted over a metal, earthenware or wooden base serving as a pot for growing living plants. Normally, moisture from an exposed plant is dissipated into the atmosphere through transpiration, so that the plant must be watered at frequent intervals, but in a terrarium the loss of moisture is slight and it is not necessary to replenish the water except occasionally.

Because of the growing popularity of terrariums, they are now mass-produced and commercially available in rigid, transparent plastic form. The terrarium consists of a plastic base having a pot formation for receiving plant soil and a plastic enclosure, cover, dome, or shell which fits over the base.

The fitted terrarium enclosure or cover is typically removed to allow more space for plants starting to outgrow the terrarium environment. However this usually creates the problem in time of having growing plant leaves hang over the planter base and even touching or laying upon the same surface the planter base rests upon.

Accordingly, there exists a need in the art for a planting system that can be used to start plants from seeds or seedlings in a terrarium environment, the same planting system having additional use when the terrarium environment is no longer needed.

SUMMARY OF THE INVENTION

The present invention enables a plant grower the ability to use a single container as a terrarium enclosure or as a planter pedestal with respect to its arrangement with another container used as a planter. The present invention provides a multi-use container eliminating the need for extra parts in a planter kit or planting system product. The present invention provides a planter tapered in shape that fits at least partially inside the enclosure/pedestal container saving packaging space and cost of packaging for each planting kit.

In general, in accordance with the present invention, a planting system includes a first container having upwardly extending walls and a bottom, the first container used for growing at least one plant and a second container having downwardly extending walls and a top, the downwardly extending walls of the second container adapted to releasably attach to the upwardly extending walls of the first container, the top of the second container adapted to releasably attach to the bottom of the first container, wherein when the downwardly extending walls of the second container are attached to the upwardly extending walls of the first container a terrarium is formed and wherein when the top of the second container is attached to the bottom of the first container a planter supported upon a pedestal is formed.

In accordance with an aspect of the present invention, a method for growing a plant includes planting one of at least one plant or at least one plant seed in a plant-growing medium disposed in a first container having upwardly extending walls and a bottom, attaching a second container having downwardly extending walls and a top to the first container to form a terrarium wherein the downwardly extending walls of the second container is adapted to releasably attach to the upwardly extending walls of the first container, determining that a height of the at least one plant has outgrown or may soon outgrow height of the second container, and releasing the second container from the first container and attaching the top of the second container to the bottom of the first container to form a planter supported upon a pedestal wherein the top of the second container is adapted to releasably attach to the bottom of the first container.

In accordance with another aspect of the present invention, a container includes a top having downwardly extending walls adapted to releasably attach to upwardly extending walls of a bottom of a planter, the top of the container further adapted to releasably attach to the bottom of the planter, wherein when the downwardly extending walls of the container are attached to the upwardly extending walls of the planter the container serves as a terrarium enclosure and wherein when the top of the container is attached to the bottom of the planter the container serves as a pedestal to support the planter.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

BRIEF DESCRIPTION OF THE DRAWINGS

FIG. 7 is an illustration of instructions for using the multi-use planting system and growing the plant.

DETAILED DESCRIPTION OF THE INVENTION

Figure 1:
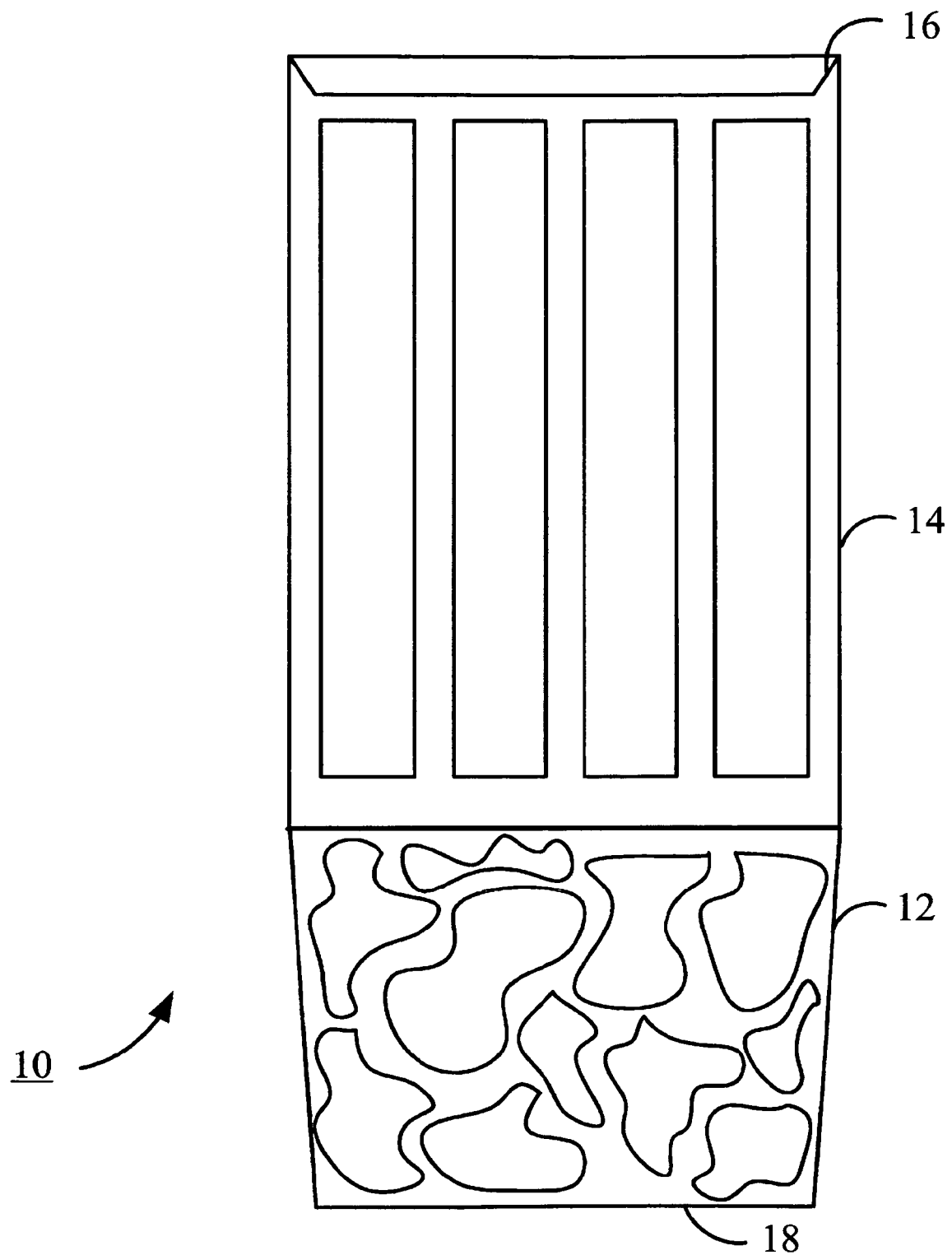
FIG. 1 is a front perspective view of an example planting system arranged as a terrarium in accordance with the present invention.

In the detailed description that follows, similar components have been given the same reference numerals, regardless of whether they are shown in different embodiments of the present invention. To illustrate the present invention in a clear and concise manner, the drawings may not necessarily be to scale and certain features may be shown in somewhat schematic form.

Referring to FIG. 1, a planting system 10 configured as a terrarium is illustrated. The planting system 10 includes a first container 12 having a bottom 18 with upwardly extending walls and includes a second container 14 having a recessed top 16 with downwardly extending walls. In the illustrated embodiment, the first container 12 defines a receptacle or planter base for receiving a plant growing medium (e.g., soil), a seed (or seeds), a seedling (or seedlings), water, plant fertilizer, and so forth (not shown). The second container 14 is attached atop the first container 12 of the planting system 10 in the illustrated embodiment to define a detachable cover that can be provided to form a terrarium and act as a "greenhouse" that traps heat and/or moisture.

Although the first container 12 and the second container 14 are illustrated as generally rectangular or box-like in shape, one skilled in the art will appreciate that the containers can have any geometric shape, such as having a circular cross-section, an oval cross-section, a triangular cross-section, a square cross-section, and so forth. In addition, the extending walls of the first container 12 and the second container 14 need not be vertical. For example, the containers can be taper-shaped, cylindrical-shaped, bowl-shaped, cone-shaped, pyramid-shaped, frustum-shaped, and so forth. Therefore, the illustrated geometrical shape of the containers is exemplary.

Figure 2:
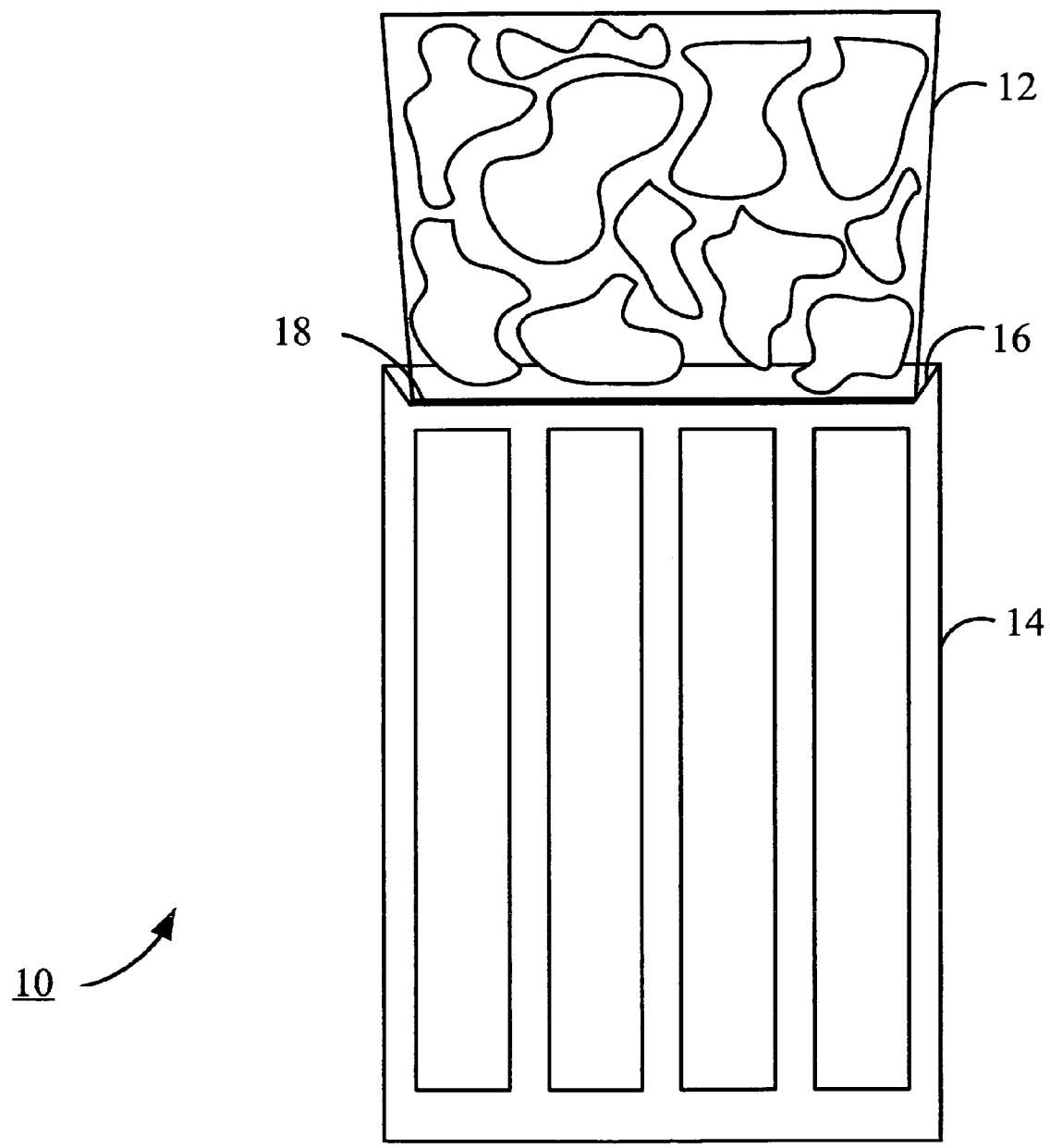
FIG. 2 is a front perspective view of the example planting system arranged as a planter upon a pedestal in accordance with the present invention.

Referring to FIG. 2, the planting system 10 configured as a planter supported upon a pedestal is illustrated. In the illustrated embodiment, the bottom 18 of the first container 12 is secured atop of the recessed top 16 of the second container 14 to form a hanging planter supported upon a pedestal. By so doing the second container 14 is convertible and can now serve the additional use as either a terrarium enclosure or planter pedestal depending upon how it is attached to the first container 12. Additionally, the top 16 of the second container 14 need not be recessed. The recessed top 16 helps provide a more stable support when the bottom 18 of the first container 12 rests upon it. In effect the second container 14 as a planter pedestal better facilitates plants that are natural hanging or have a trailing growth habit.

Figure 3:
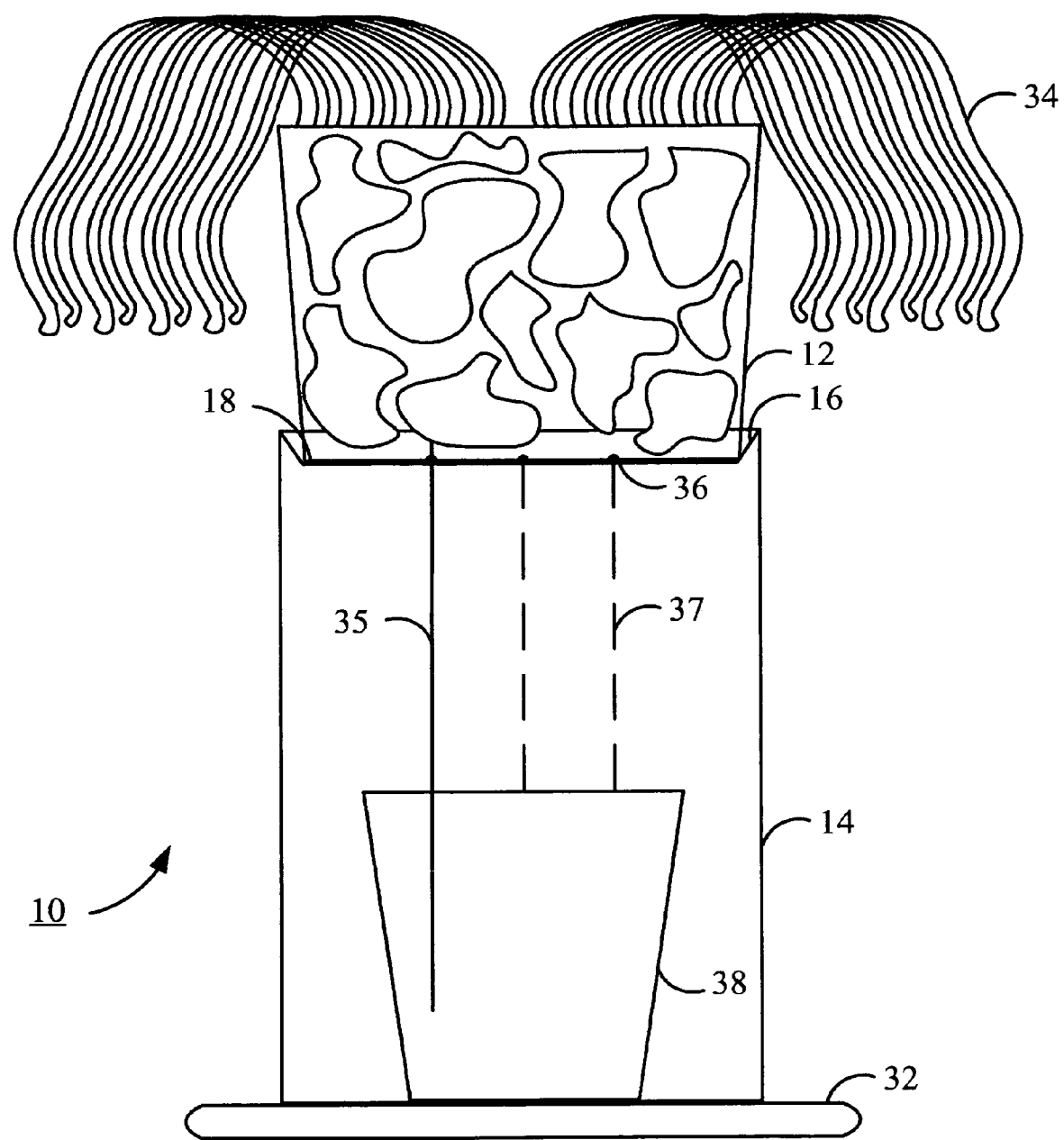
FIG. 3 is a front perspective view of the example planting system arranged as a planter upon a pedestal further including a water reservoir and pedestal base in accordance with the present invention.

Referring to FIG. 3, the planting system 10 configured as a planter supported upon a pedestal having additional parts is illustrated. In the illustrated embodiment, a third container 38 such as a cup is positioned atop of a pedestal base 32 with the extending walls of the second container 14 also attached atop of the pedestal base 32 thereby enclosing the third container 38 within the second container 14. Drainage holes or weep holes 36 can be made upon the bottom 18 of the first container 12 and can be provided or made upon the recessed top 16 of the second container 14 such that the drainage holes 36 become aligned when the bottom 18 of the first container 12 is secured atop of the recessed top 16 of the second container 14 to form the hanging planter supported upon the pedestal. Upon watering the plant 34, any excess water can drip 37 through the drainage holes 36 and land in the third container 38 which acts as a water reservoir. One of the holes 36 can be used to place a capillary watering wick 35 that extends from the first container 12 to the water reservoir or third container 38. By so doing, a capillary action can be formed so that water from the reservoir can return to the first container 12 so that the plant can be to some degree a self-watering plant. In another embodiment, markings or perforations can be placed upon the bottom 18 of the first container 12 and upon the recessed top 16 of the second container 14 to indicate the location of where holes 36 for air, drainage, and watering wick 35 can be made by a user of the planting system 10. Drainage holes 36 in the first container 12 are not necessary when the second container 14 is used as a terrarium enclosure. In some planting systems 10, holes in the second container 14 are made before distributed to plant growers such that the holes are used only for the exchange of air when the second container 14 functions as a terrarium enclosure and the holes used for drainage when the second container 14 functions as a planter pedestal.

Figure 4:
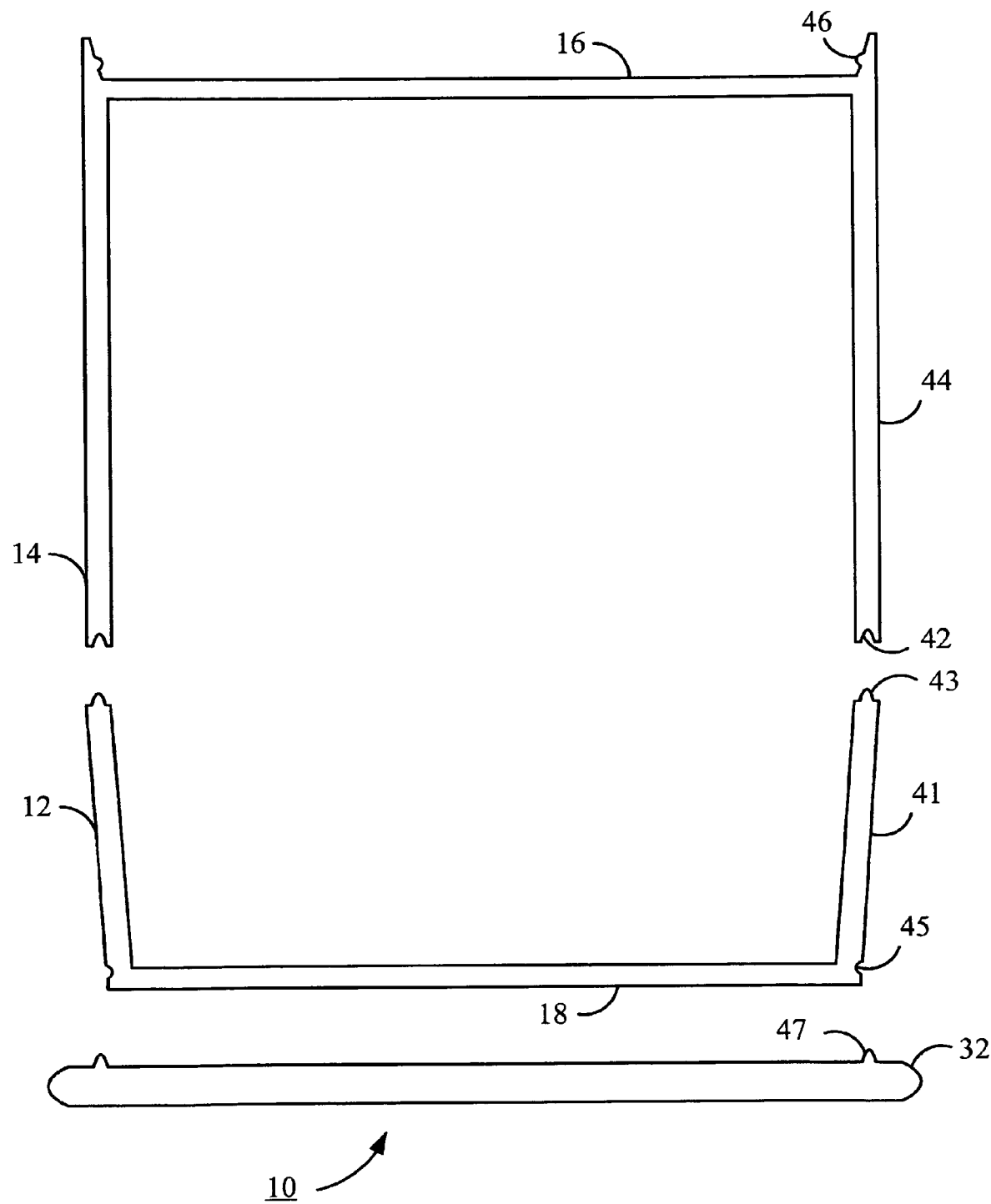
FIG. 4 is a cross-sectional view of the example planting system including showing one aspect of how a first container and a second container can be releasably attached to each other in accordance with the present invention.

Referring now to FIG. 4, a cross-sectional view of one aspect of how the first container and the second container of the planting system can be releasably attached to each other is shown. A rib, tongue, or protrusion 43 is formed along the perimeter of the brim of the upwardly extending walls 41 extending from the bottom or bottom member 18 of the first container 12. A recess or groove 42 is formed along the perimeter of the brim of the downwardly extending walls 44 extending from the recessed top or top member 16 of the second container 14. The rib, tongue, or protrusion 43 is designed to press-fit or snap-fit into the recess or groove 42 to releasably attach/secure the containers by creating a seal between the first container 12 and the second container 14 to form the terrarium of the planting system 10.

Another protrusion 46 is formed near the recessed top 16 of the second container 14 and designed to press-fit or snap-fit into another recess 45 located on the outer portion of the upwardly extending walls 41 near the bottom or bottom member 18 of the first container 12 to releasably attach/secure the first container 12 and the second container 14 together to form the planter supported upon a pedestal of the planting system 10. In another embodiment, snap-fit or press-fit action is not used nor needed because the recessed top 16 of the second container 14 is designed in a way to independently support the bottom or bottom member 18 of the first container 12 without the requirement of the protrusion 46 or recess 45.

The recess or groove 42 formed along the perimeter of the brim of the downwardly extending walls 44 of the second container 14 can also releasably attach/secure to yet another protrusion 47 formed near the outer top portion of the pedestal base 32 so that the planter supported upon the pedestal of the planting system 10 can be further supported atop the pedestal base 32.

Figure 5:
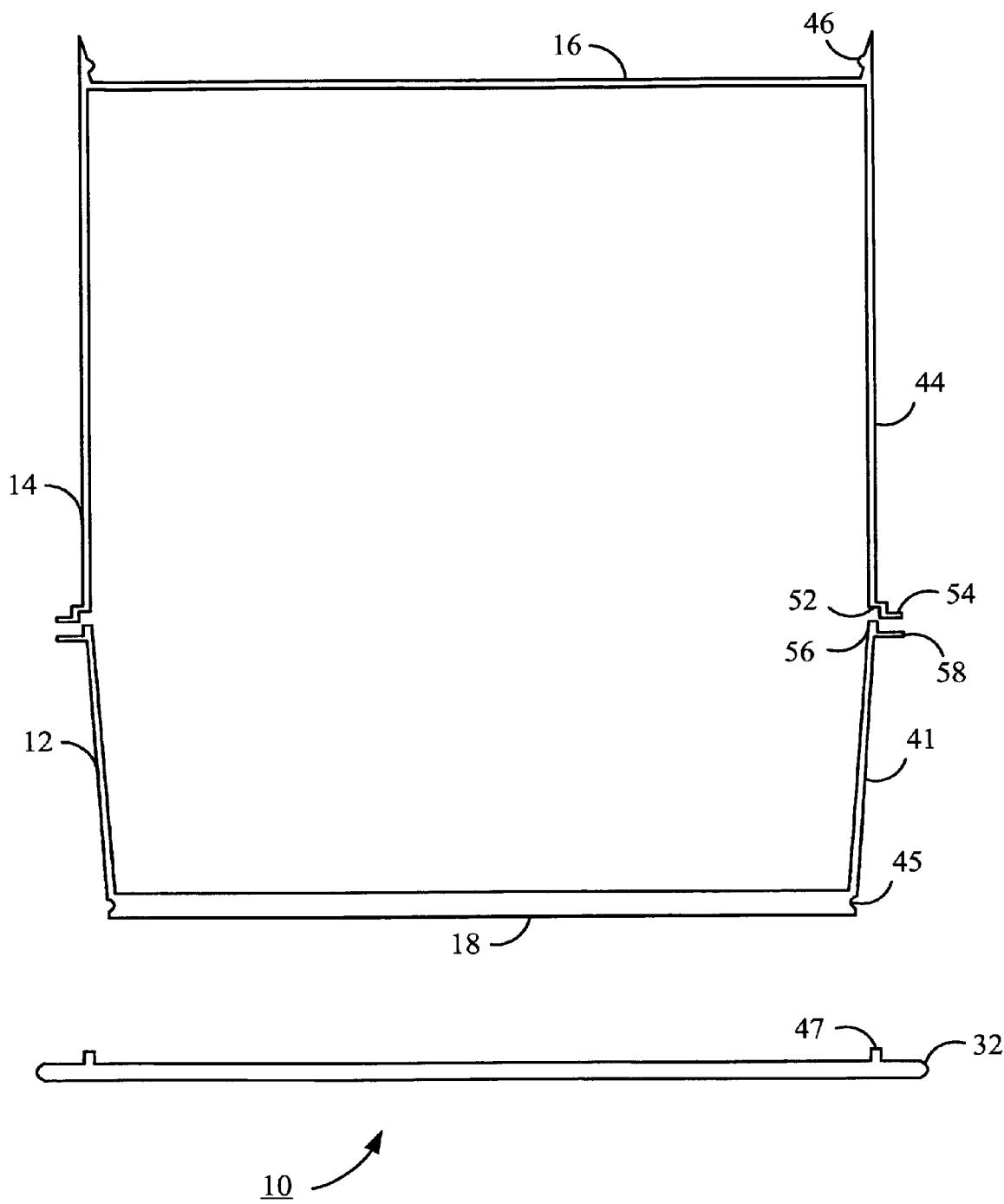
FIG. 5 is a cross-sectional view of the example planting system including showing another aspect of how the first container and the second container can be releasably attached to each other in accordance with the present invention.

Referring now to FIG. 5, a cross-sectional view of another aspect of how the first container and the second container of the planting system can be releasably attached to each other is shown. A tab 58 is formed just below the brim 56 of the upwardly extending walls 41 of the first container 12. A step-like recessed pattern having another tab 54 is formed along the perimeter of the brim 52 of the downwardly extending walls 44 of the second container 14. The brim 56 of the upwardly extending walls 41 of the first container 12 is designed to press-fit or snap-fit into step-like recessed pattern along the perimeter of the brim 52 of the downwardly extending walls 44 of the second container 14 so that when the containers are releasable attached/secured to each other to form the terrarium, the tab 58 of the first container 12 and the tab 54 of the second container 14 are aligned and touching. The tabs are of a sufficient size to enable a user to carry the planting system 10 and for releasing the first container 12 and second container 14 from each other.

The containers can be thermal molded (thermoformed) or injection molded using any suitable polymer as is known in the art, such as polystyrene, alkyl benzene, sulfonate (ABS), polyethylene, polypropylene, or the like and any copolymers thereof. Other techniques for fabricating the containers are contemplated. For example, the containers can be blow molded as one piece or can be assembled from multiple pieces. When assembled from multiple pieces, the pieces can be secured to each other using, for example, an adhesive or fusing technique.

The planting system 10 can be provided with a variety of visual appearances by changing the color of the planting system 10 or components thereof. For example, the planting system 10 can be molded from a clear or translucent material. Alternatively, the planting system 10 can be molded from a colored resin, such as green, red, brown and so forth. In another embodiment, the planting system 10 can be made from glow-in-the-dark material. In one embodiment, the planting system 10 is given a mottled, terra-cotta appearance by molding the planting system 10 from a terra-cotta colored polymer (e.g., a brownish-red or yellowish-red color often found on fired clay or earthenware). Thereafter, the planting system 10 can be painted with one or more colors using a sprayer that randomly mists droplets of paint onto the planting system 10. Colors for those paints can include, for example, a cream color, a brown color, a red color, a green color, and so forth.

Container dimensions are generally designed in accordance with variables of plant size, plant type, and grow time or other factors such as shipping, retail merchandise planning, distribution channels, and product price, for example. In one application the planting system could serve as a theme-based convertible tall terrarium/hanging planter which can occupy space on a windowsill or small table. The kit or planting system product 10 can include thermoformed containers having a thickness of about 0.03" in which case the tab system as discussed above would be employed. The first container or planter 12 can be thermoformed with a terra-cotta color with the texture of a stone with mortar design and have a cross-section in the shape of a tapered-square with a length/width of 3.5" at the bottom 18, a height of 3" for the upwardly extending walls, and the brim of the walls having a 4" length/width. The second container 14 can be thermoformed with a translucent or clear color with the texture of outlined windows with thicker line edges and also have a 4" length/width and a height of about 8" for the upwardly extending walls. The water reservoir or third container 35 is smaller in dimension than the second container 14 such that the third container 35 can be completely enclosed by the second container 14. Similarly, the kit or planting system 10 product can include injection molded containers having a thickness of about 0.125" or 0.25" or thicker depending upon the application which would be capable of supporting length/width/height dimensions on the order of feet (instead of inches) for very tall growing plants or for products that may be supported on the floor as opposed to a small windowsill, for example. The rib, tongue, or protrusion 43 fitted into the recess or groove 42 (see FIG. 4) may be the design used for press-fitting the containers together because of the thicker extending walls of the containers from the injection mold process.

Space could be saved when packaging the planting system 10. For instance, soil, rocks, plant seeds, and pedestal base can be placed inside the second container 14. The first container 12 could then be attached to the second container 14 to form the terrarium as discussed above. Further space can be saved when the first container 12 is taper-shaped by turning it upside-down and placing the bottom 18 inside of the brim of the second container 14. By so doing the overall height of a package for the planting kit is significantly decreased requiring much less surface area which also helps decrease shipping costs per unit or per case.

Figure 6:
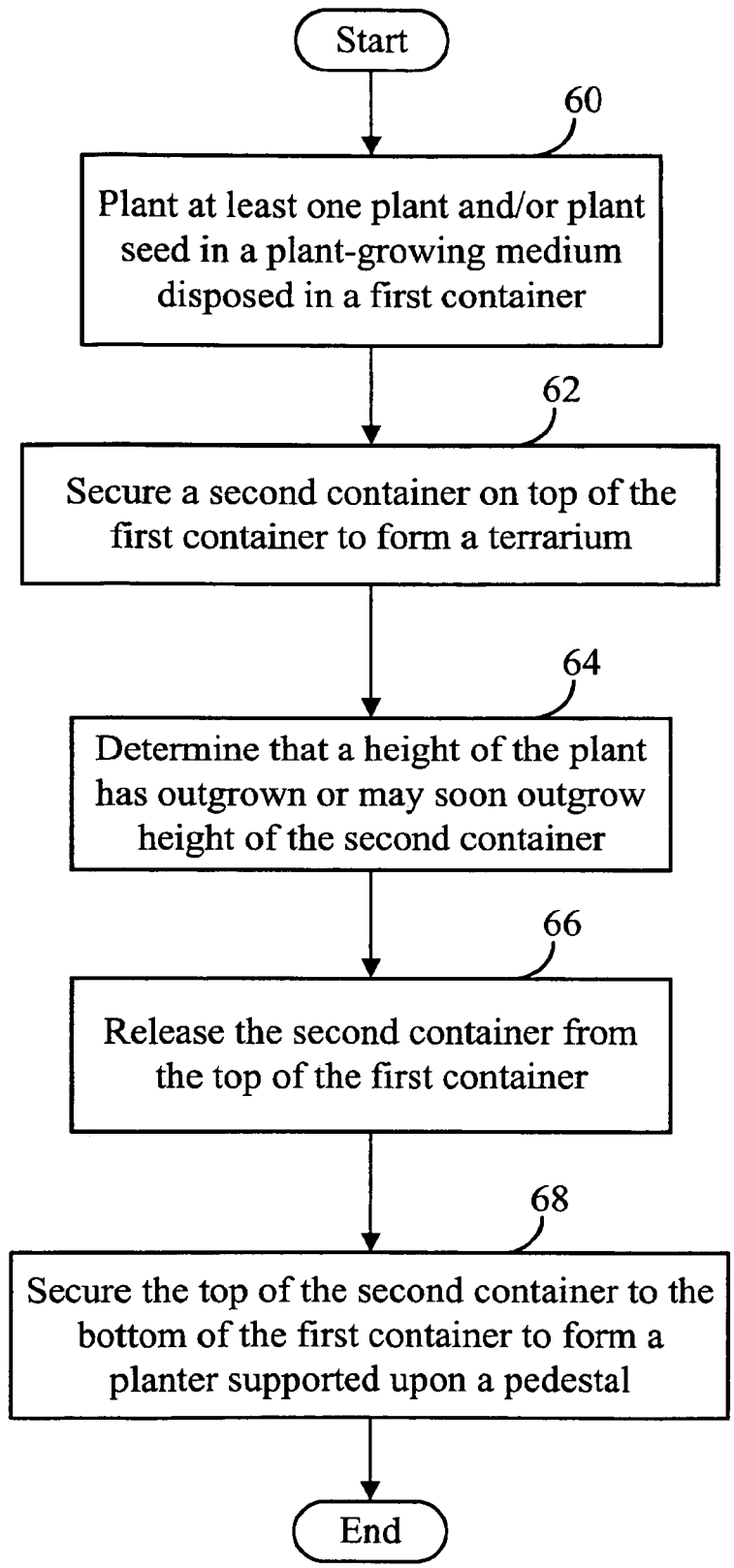
FIG. 6 is a flowchart illustrating the steps performed for growing a plant.

Referring now to FIG. 6, a flowchart of steps for growing a plant is shown. At least one plant and/or plant seed in a plant-growing medium is disposed in the first container 12 and planted in step 60. The second container 14 is attached in step 62 atop the first container 12 to form a terrarium. It is then determined in step 64 that a height of at least one plant has outgrown or may soon outgrow height of the second container 14. The second container 14 is then detached in step 66 from the first container 12. At this point drainage holes 36 can be made if need be in the first container 12 and the second container 14. The top 16 of the second container 14 is attached in step 68 to the bottom 18 of the first container 12 to form a planter supported upon a pedestal.

Referring now to FIG. 7, instructions for using the multi-use planting system for growing a plant is shown. Instructions 72 include describing how to use the multi-use planting system 10. Instructions 72 describe the inclusion of the first container 12 and the second container 14. The first container 12 used for placing soil, water, seeds, and/or plants and the second container 14 used in at least two ways including snap-fitting the second container 14 atop of the first container 12 to form a terrarium and also snap-fitting the first container 12 atop of the second container 14 to form a planter supported upon a pedestal. Instructions 72 further include conditions of when to use the second container 14 as a terrarium enclosure or as a pedestal while growing the plant.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method for growing a plant comprising:
    planting one of at least one plant or at least one plant seed in a plant-growing medium disposed in a first container having upwardly extending walls and a bottom;
    attaching a second container having downwardly extending walls and a top to said first container to form a terrarium wherein said downwardly extending walls of said second container are adapted to releasably attach to said upwardly extending walls of said first container;
    determining that a height of said at least one plant has outgrown or may soon outgrow height of said second container; and,
    releasing said second container from said first container and attaching said top of said second container to said bottom of said first container to form a planter supported upon a pedestal wherein said top of said second container is adapted to releasably attach to said bottom of said first container.

2. A method, as set forth in claim 1, further including attaching a pedestal base to said downwardly extending walls of said second container wherein said pedestal base is adapted to releasably attach to said downwardly extending walls of said second container.

3. A method, as set forth in claim 1, further including making one or more holes in said top of said second container and said bottom of said first container, each said hole used to communicate at least one of air and fluid from said first container to said second container after said attaching said top of said second container to said bottom of said first container.

4. A method, as set forth in claim 3, wherein said top of said second container and said bottom of said first container each include one or more markings, each said marking indicative of a location for making each said hole.

5. A method, as set forth in claim 1, wherein said top of said second container and said bottom of said first container each include one or more holes, each said hole used to communicate at least one of air and fluid from said first container to said second container and further including positioning a third container having upwardly extending walls and a bottom inside of said second container for use as a fluid reservoir when fluid is communicated from said first container to said second container, said third container having a length, width, and height smaller than a length, width, and height of said second container.

6. A method, as set forth in claim 5, further including watering said at least one plant in said first container.

7. A method, as set forth in claim 1, further including attaching a third container having upwardly extending walls and a bottom to a pedestal base wherein said bottom of said third container is adapted to releasably attach to said pedestal base.

8. A method, as set forth in claim 7, further including attaching said pedestal base to said downwardly extending walls of said second container wherein said pedestal base is adapted to releasably attach to said downwardly extending walls of said second container.

9. A method, as set forth in claim 8, wherein said top of said second container and said bottom of said first container each include one or more holes, each said hole used to communicate at least one of air and fluid from said first container to said second container and further including the step of positioning said third container inside of said second container for use as a fluid reservoir when fluid is communicated from said first container to said second container, said third container having a length, width, and height smaller than a length, width, and height of said second container.

\* \* \* \* \*